US005232308A

United States Patent [19]

Verstraeten

[11] Patent Number: 5,232,308

[45] Date of Patent: Aug. 3, 1993

[54] EMERGENCY SPILL BASIN

[75] Inventor: Alexander J. Verstraeten, Knokke-Heist, Belgium

[73] Assignee: Funderingstechnieken Verstraeten B. V., Oostburg, Netherlands

[21] Appl. No.: 821,646

[22] Filed: Jan. 16, 1992

[30] Foreign Application Priority Data

Jan. 17, 1991 [NL] Netherlands ........................ 9100084

[51] Int. Cl.⁵ ................................................ B65G 5/00

[52] U.S. Cl. ...................................... 405/53; 137/312; 405/52; 588/259; 169/69

[58] Field of Search .................... 405/52, 53, 128, 129, 405/55; 137/312, 356, 362; 169/69; 588/249, 259

[56] References Cited

U.S. PATENT DOCUMENTS 3,687,329 8/1972 Baum ............................... 220/26 R
3,871,459 3/1975 Falgayrettes et al. ................ 169/49
4,194,570 3/1980 Arencibia ......................... 169/69 X
4,404,988 9/1983 Trammell ........................ 137/312 X
4,682,911 7/1987 Moreland ............................ 588/259
4,787,772 11/1988 Wagner ................................ 405/53
4,947,888 8/1990 Tanner ............................... 137/312

FOREIGN PATENT DOCUMENTS 2020671 11/1970 Fed. Rep. of Germany .
2185153 12/1973 France .
540472 10/1941 United Kingdom .

*Primary Examiner*—David H. Corbin
*Attorney, Agent, or Firm*—Kenyon & Kenyon

[57] ABSTRACT

The invention relates to an emergency spill basin for collecting flammable and/or environmentally unsound materials issuing from a chemical plant in the event of a major accident. According to the invention, the basin comprises a deep shaft (1) constructed in the ground, which is closed at the bottom (2) and has a diameter smaller than its depth. Arranged in the longitudinal direction of the shaft (1) is a fire-extinguishing gas pipe (4) extending into the vicinity of the bottom (2) of the shaft and comprising outlet openings (5) spaced along its length. Provided on the bottom (2) of the shaft is a layer of nonflammable granules (3) of low specific gravity.

5 Claims, 2 Drawing Sheets

EMERGENCY SPILL BASIN

This invention relates to an emergency spill basin for collecting flammable and/or environmentally unsound materials issuing from a chemical plant in the event of a major accident.

It is increasingly becoming common practice for chemical plants to be erected on a concrete floor constructed so as to slope and terminating in an emergency spill basin. The point is that in the event of a major accident involving fire, the flammable and/or environmentally unsound materials automatically collect in the spill basin, together with the fire-extinguishing water spent. Such an emergency spill basin typically consists of a concrete trough having a small depth and a large area. The depth is chosen to be small on account of the groundwater level because the trough would be pushed up by the groundwater if the trough were designed to be deeper. To provide yet a spill basin of sufficient volume, the concrete trough must cover a large area, which, in turn, is often objectionable in view of a lack of space. In the case of a fire, the emergency spill basin must also catch the fire-extinguishing water. Since most chemical products and oil products are lighter than water, they will float on the water, also while burning. In that case, an undeep emergency spill basin that covers a large area will give off an enormous amount of radiant heat to the surroundings, thereby seriously impeding the extinguishing operations and increasing the risk of the fire spreading.

It is an object of the present invention to provide an emergency spill basin in which these disadvantages are obviated. To that end, the emergency spill basin according to the invention comprises a deep shaft constructed in the ground, which is closed at the bottom and has a diameter smaller than its depth, there being arranged in the longitudinal direction of the shaft a fire-extinguishing gas pipe extending into the vicinity of the bottom of the shaft and comprising outlet openings spaced along the length thereof, while a layer of nonflammable granules of low specific gravity is provided on the bottom of the shaft.

By providing in the immediate vicinity of a chemical plant a deep shaft having a depth of up to approximately 60 m and a sectional area of 8–10 $m^2$, an emergency spill basin of a volume of 600 $m^3$ is obtained. While the shaft-shaped emergency spill basin is filling up as a consequence of a major accident, the fire can be extinguished using the fire-extinguishing gas pipe extending into the shaft. The layer of nonflammable granules of low specific gravity resting on the bottom of the shaft will remain floating on the surface of the liquid and screen it, so that the flames are smothered. It is observed that it is known in the art relating to water treatment to use reactors of a sectional area of 8–10 $m^2$ arranged in the ground to a depth of approximately 60 m.

It is advantageous to arrange for a foam supply pipe fitted with a spray nozzle to terminate in the upper part of the shaft. Thus, foam can be supplied to cover chemical liquids having a low boiling point, which evaporate spontaneously in the atmosphere.

An environment without oxygen can be maintained in the spill basin by arranging in the shaft a downcomer for the liquid comprising an inlet funnel whose top edge adjoins a concrete floor of sloping configuration. A pressure relief valve can be mounted in this inlet funnel to permit the flame-extinguishing gas that comes from the gas pipe to escape from the spill basin.

It is easy to increase the capacity of the emergency spill basin by providing a second identically constructed spill basin in the form of a deep shaft next to the first basin and to bring them into communication with each other by means of an overflow pipe terminating in the upper parts of the two shafts. Embodiments of the emergency spill basin according to the invention will now be further explained, by way of example, with reference to the accompanying drawings, in which.

Figure 2:
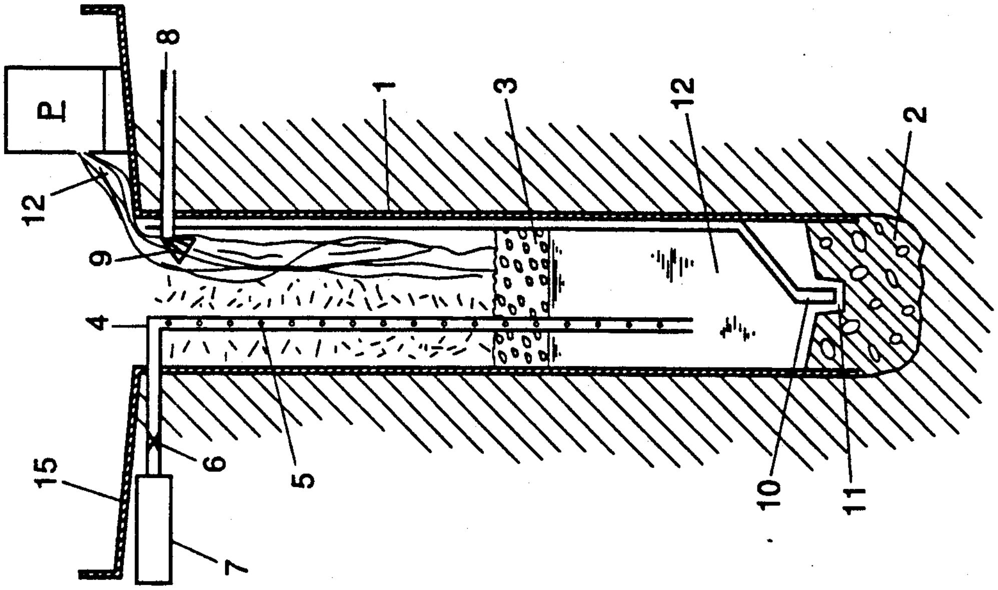
FIG. 2 shows the emergency spill basin of FIG. 1 after a major accident has occurred in the chemical plant in question.
Figure 1:
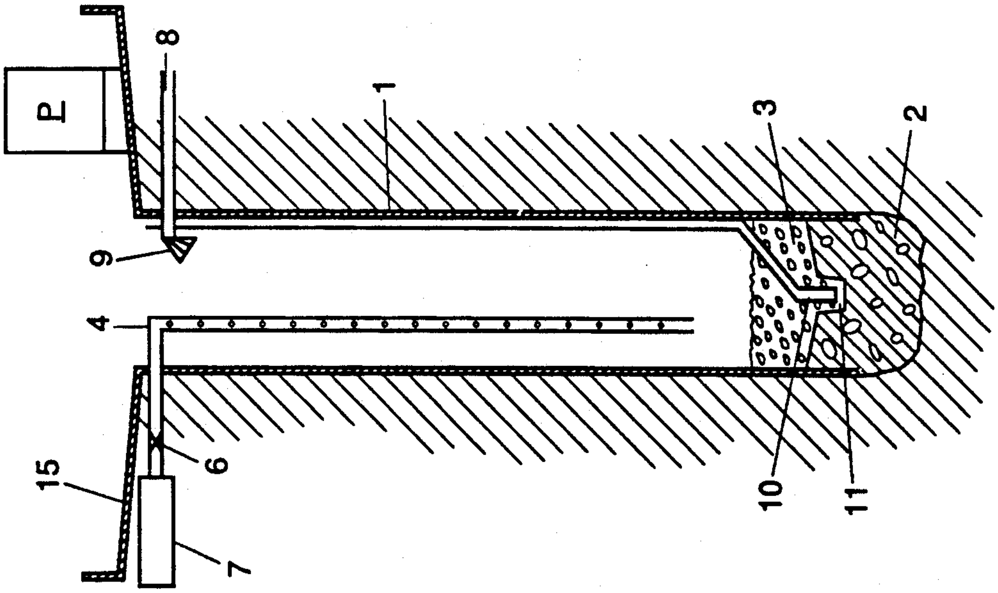
FIG. 1 shows a first embodiment of an emergency spill basin in empty condition.

FIGS. 1 and 2 are diagrammatic views of a chemical plant P resting on a concrete floor 15 constructed so as to slope. Constructed in the ground adjacent the chemical plant P is a deep shaft 1 extending to a depth of about 60 m and having a sectional area of 8–10 $m^2$. The wall of the shaft can be formed by a metal or concrete tube which may optionally be provided with a protective layer for protection against the aggressive materials to be collected in the emergency spill basin. Provided in the bottom of the shaft is a concrete plug 2 sealing the shaft at the bottom. Provided on the concrete plug 2 is a layer of nonflammable granules of low specific gravity, e.g., 0.8. The nonflammable granules are for instance ceramic or metal granules of any shape. Arranged in the shaft 1 is a fire-extinguishing gas pipe 4 extending from the top down into the vicinity of the bottom of the shaft. The gas pipe 4 is provided with outlet openings 5 and connected to a gas reservoir 7 comprising a shut-off valve 6. The extinguishing gas may for instance be $CO_2$ or carbon dioxide foam. The use of the latter is advantageous in that this fire-extinguishing agent can fulfil a temperature-lowering function in addition to its flame-extinguishing function.

Further, terminating in the upper part of the shaft 1 is a foam supply pipe 8 having a spray nozzle 9 mounted at its end. Through this foam pipe 8 with spray nozzle 9, foam can be supplied to form a foam sheet or screen in the shaft, preventing the liquids collected in the shaft from evaporating after the fire has been extinguished.

A pump 10 is positioned on the bottom of the shaft in a hole 11 in the concrete plug 2. Connected to the pump 10 is an upwardly extending pressure pipe for draining the shaft.

FIG. 2 shows the shaft 1 after it has been filled from the chemical plant P as a result of a major accident in the plant. The liquid 12 issuing from the plant P flows via the sloping concrete floor 15 into the emergency spill basin and collects at the bottom of shaft 1. Upon entering the shaft 1, the liquid 12 is extinguished with the fire-extinguishing gas flowing from the openings 5 in the gas pipe 4. The layer of granules 3 floats on the surface of the chemical liquid 12 collected at the bottom of the shaft 1, thereby screening the top surface of the chemical liquid 12. The upper part of the shaft is filled with gas issuing from pipe 4, and optionally with a screen of foam coming from the foam supply pipe 8.

Figure 3:
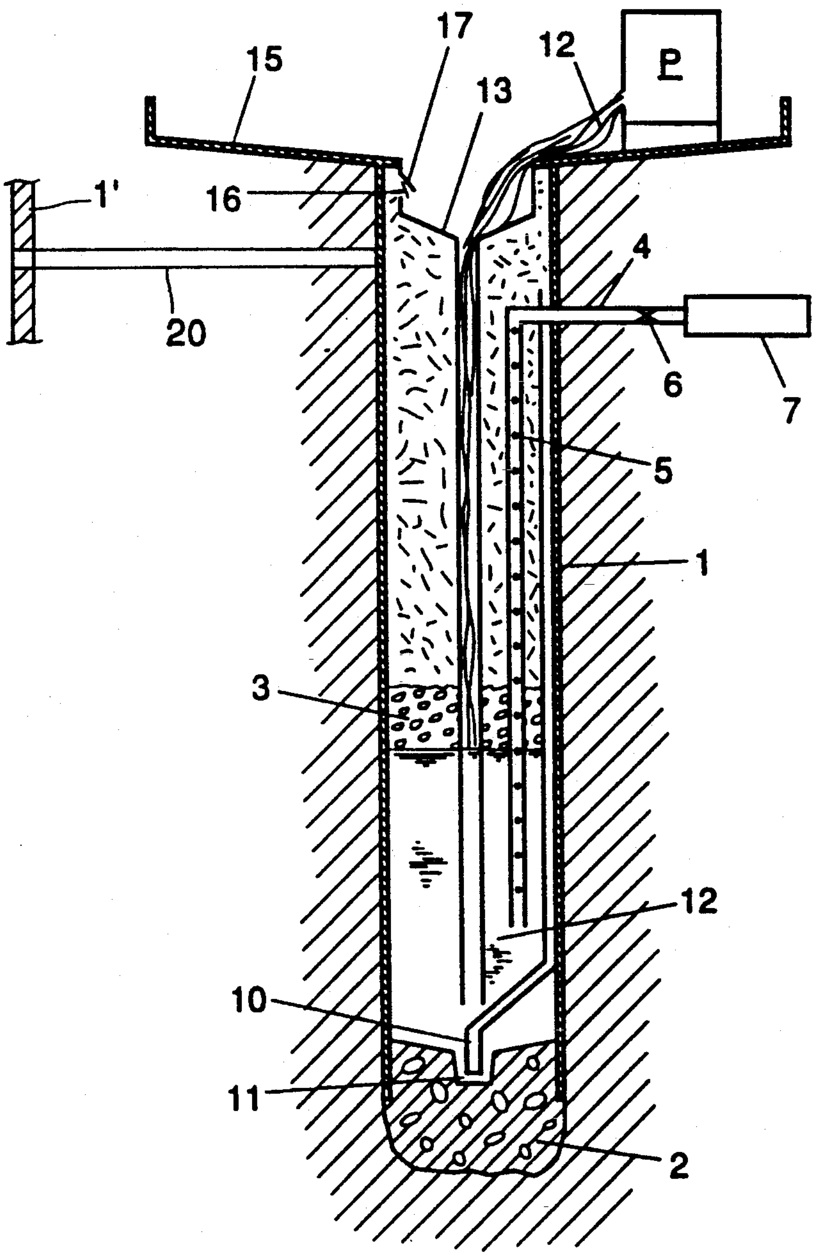
FIG. 3 shows a second embodiment of an emergency spill basin.

The embodiment of the emergency spill basin shown in FIG. 3 differs from that of FIG. 1 only in that it comprises a downcomer 14 comprising at the top thereof an inlet funnel 13. The inlet funnel 13 comprises at the top edge thereof a cylindrical connecting part 16 which can be connected to the edge of the sloping concrete floor 15 with a gap between them. The gap permits the fire-extinguishing gas collected in the shaft 1 to escape. It is also possible to form a sealing connection between the connecting part 16 and the concrete floor 15 and mount one or more pressure relief valves 17 in the connecting part 16 for allowing the fire-extinguishing gas collected in the shaft to escape.

In FIG. 3, an overflow pipe 20 terminates in the upper parts of two adjacent spill basins, the adjacent spill basin being schematically indicated by 1'.

I claim:

1. An emergency spill basin for collecting large volumes of flammable and/or environmentally unsound materials issuing from a chemical plant in the event of a major accident, characterized in that the basin comprises a deep shaft (1) constructed in the ground, which is closed at the bottom (2) located below ground water level and has a diameter considerably smaller than its depth, there being arranged in the longitudinal direction of the shaft (1) a fire-extinguishing gas pipe (4) extending into the vicinity of the bottom (2) of the shaft and comprising outlet openings (5) spaced along the length thereof, and a layer of nonflammable granules (3) of low specific gravity is provided on the bottom (2) of the shaft.

2. An emergency spill basin as claimed in claim 1, characterized in that a foam supply pipe (8) comprising a spray nozzle (9) terminates in the upper part of the shaft (1).

3. An emergency spill basin as claimed in claim 1, characterized in that a downcomer (14) for the liquid is arranged in the shaft (1), said downcomer (14) comprising an inlet funnel (13) whose top edge adjoins a sloping concrete floor (15).

4. An emergency spill basin as claimed in claim 3, characterized in that the inlet funnel (13) comprises a cylindrical top portion (16) provided with at least one pressure relief valve.

5. An emergency spill basin as claimed in claim 1 characterized in that an overflow pipe terminates in the top part of the wall of the shaft, the other end of said overflow pipe terminating in the wall of a shaft of an identically constructed emergency spill basin provided at a distance therefrom.

* * * * *